(12) United States Patent
Onomatsu et al.

(10) Patent No.: US 7,502,072 B2
(45) Date of Patent: Mar. 10, 2009

(54) TELEVISION BROADCAST RECEIVER WITH CAPTION DISPLAY CAPABILITY USING PARAMETER SETTING IMAGES

(75) Inventors: Takehiro Onomatsu, Daito (JP); Toshihiro Takagi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 597 days.

(21) Appl. No.: 11/187,880

(22) Filed: Jul. 25, 2005

(65) Prior Publication Data

US 2006/0017845 A1 Jan. 26, 2006

(30) Foreign Application Priority Data

Jul. 23, 2004 (JP) ............... 2004-216439

(51) Int. Cl.
*H04N 7/08* (2006.01)
*H04N 5/445* (2006.01)
(52) U.S. Cl. .................. 348/468; 348/465; 348/569; 348/564; 348/563; 348/473
(58) Field of Classification Search ........... 348/468, 348/469, 465, 461, 473, 564, 563, 569, 553, 348/725; 725/137, 136, 40
See application file for complete search history.

(56) References Cited

U.S. PATENT DOCUMENTS

| | | | | |
|---|---|---|---|---|
| 6,297,797 B1 * | 10/2001 | Takeuchi et al. | ............. | 345/467 |
| 6,373,526 B1 * | 4/2002 | Kessler et al. | ............... | 348/468 |
| 6,734,917 B2 * | 5/2004 | Kim | ............................. | 348/461 |
| 6,912,013 B2 * | 6/2005 | Katayama et al. | ............ | 348/564 |
| 6,985,190 B1 * | 1/2006 | Klopfenstein et al. | ........ | 348/569 |
| 7,006,151 B2 * | 2/2006 | Dieterich | ..................... | 348/565 |
| 7,050,109 B2 * | 5/2006 | Safadi et al. | ................. | 348/468 |
| 7,161,631 B2 * | 1/2007 | Katayama et al. | ............ | 348/468 |
| 7,184,095 B2 * | 2/2007 | Katayama | .................... | 348/468 |
| 7,315,881 B2 * | 1/2008 | Menez | ........................ | 709/206 |
| 7,349,429 B2 * | 3/2008 | Lee et al. | ..................... | 370/466 |
| 2002/0122136 A1 | 9/2002 | Safadi et al. | | |

FOREIGN PATENT DOCUMENTS

JP  2003-009096 A  1/2003

* cited by examiner

*Primary Examiner*—David L Ometz
*Assistant Examiner*—Jean W Désir
(74) *Attorney, Agent, or Firm*—Crowell & Moring LLP

(57) ABSTRACT

For changing setting of caption output format, a TV receiver sequentially outputs, to a monitor; a font setting image having options of two parameters, font type and size, in matrix; a color setting image having options of foreground and background colors in matrix; an edge setting image having options of edge type and color in matrix; and an opacity setting image having options of foreground and background opacities in matrix, and allows user to select the options of each two parameters based on each setting image, and further changes the setting image to be output to the monitor, depending on whether "Transparent" is selected as the foreground and/or background color. The TV receiver excludes, from each setting image, an option combination of two options, one causing loss of discriminability of the other, to make impossible selection of such option combination. The user can quickly complete intended setting without redundant procedures.

16 Claims, 13 Drawing Sheets

FIG.2

| | | |
|---|---|---|
| 31 — ①FONT TYPE | FONT0~7 | — 31a |
| 32 — ②FONT SIZE | LARGE<br>MIDDLE<br>SMALL | — 32a |
| 33 — ③FOREGROUND COLOR | BLACK   BLUE<br>WHITE   YELLOW<br>RED     MAGENTA<br>GREEN   CYAN<br>TRANSPARENT | — 33a |
| 34 — ④BACKGROUND COLOR | BLACK   BLUE<br>WHITE   YELLOW<br>RED     MAGENTA<br>GREEN   CYAN<br>TRANSPARENT | — 34a |
| 35 — ⑤EDGE COLOR | BLACK   BLUE<br>WHITE   YELLOW<br>RED     MAGENTA<br>GREEN   CYAN | — 35a |
| 36 — ⑥EDGE TYPE | NONE<br>RAISED<br>DEPRESSED<br>UNIFORM<br>LEFT DROP SHADOW<br>RIGHT DROP SHADOW | — 36a |
| 37 — ⑦FOREGROUND OPACITY | SOLID<br>FLASHING<br>TRANSLUCENT | — 37a |
| 38 — ⑧BACKGROUND OPACITY | SOLID<br>FLASHING<br>TRANSLUCENT | — 38a |

30 b (FOREGROUND OPACITY)

FIG.12  PROIR ART

130

| | | |
|---|---|---|
| 131 — ①FONT TYPE | FONT0~7 | — 131a |
| 132 — ②FONT SIZE | LARGE<br>MIDDLE<br>SMALL | — 132a |
| 133 — ③FOREGROUND COLOR | BLACK    BLUE<br>WHITE    YELLOW<br>RED      MAGENTA<br>GREEN    CYAN | — 133a |
| 134 — ④BACKGROUND COLOR | BLACK    BLUE<br>WHITE    YELLOW<br>RED      MAGENTA<br>GREEN    CYAN | — 134a |
| 135 — ⑤EDGE COLOR | BLACK    BLUE<br>WHITE    YELLOW<br>RED      MAGENTA<br>GREEN    CYAN | — 135a |
| 136 — ⑥EDGE TYPE | NONE<br>RAISED<br>DEPRESSED<br>UNIFORM<br>LEFT DROP SHADOW<br>RIGHT DROP SHADOW | — 136a |
| 137 — ⑦FOREGROUND OPACITY | SOLID<br>FLASHING<br>TRANSLUCENT<br>TRANSPARENT | — 137a |
| 138 — ⑧BACKGROUND OPACITY | SOLID<br>FLASHING<br>TRANSLUCENT<br>TRANSPARENT | — 138a |

FIG.13  PROIR ART
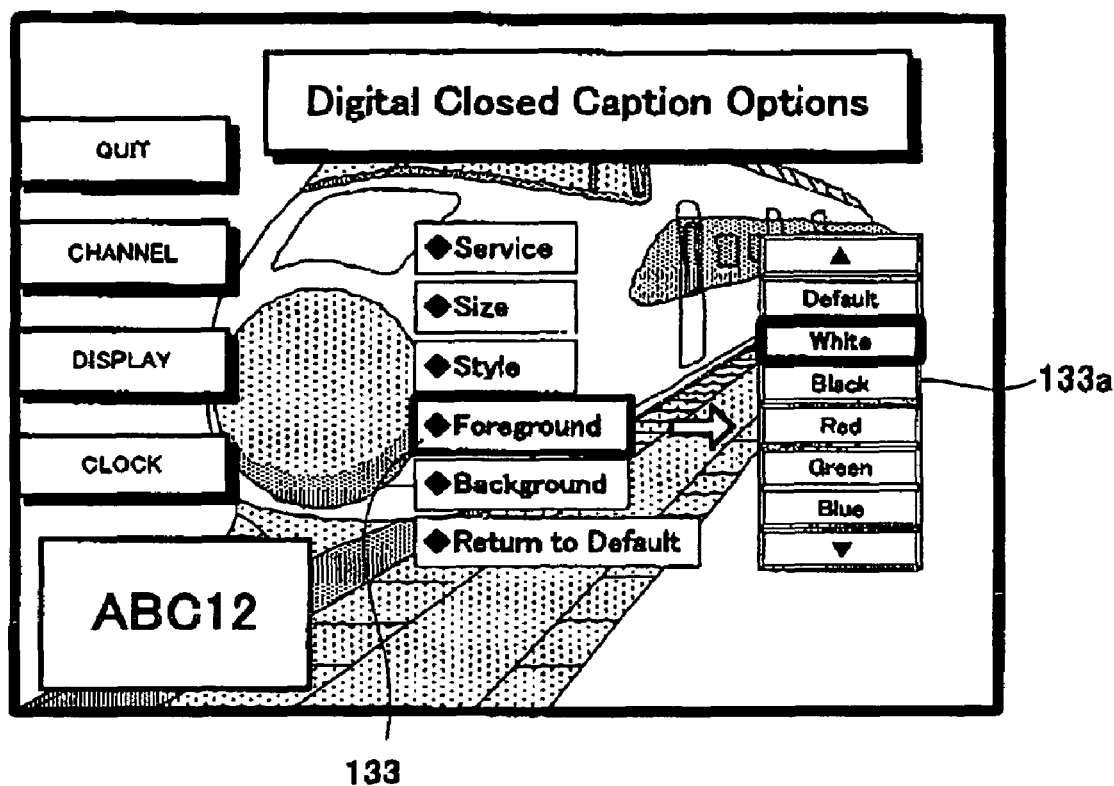

TELEVISION BROADCAST RECEIVER WITH CAPTION DISPLAY CAPABILITY USING PARAMETER SETTING IMAGES

BACKGROUND OF THE INVENTION

1. Field of the Invention

The present invention relates to a television broadcast receiver with caption display capability.

2. Description of the Related Art

A television broadcast receiver with caption display capability is known that extracts caption information from a television broadcast signal containing the caption information, and that superimposes, on an image of a television program, the thus extracted caption information as caption (such as closed caption) for monitor output. In the United States of America, the EIA (Electronic Industries Association)-608 and EIA-708 provide standards for closed caption. Broadcast stations can transmit television broadcast signals containing closed caption data specifically designating various parameters for a closed caption output format conforming to these standards, so as to enable a television broadcast receiver to display the closed caption.

The EIA-708 standard provides a specification for a user of a television broadcast receiver to optionally set a part of the parameters. Referring to FIG. 12, which shows a parameter table 130 listing parameters for a closed caption according to a prior art, the parameters include e.g. font type 131, font size 132, foreground color (text color, i.e. character color) 133, background color 134, edge color 135, edge type 136, foreground opacity (text opacity) 137 and background opacity 138. Each of the parameters 131 to 138 includes multiple options 131a to 138a, respectively, such as color options 133a. The user of the television broadcast receiver can adjust these parameters 131 to 138 so as to optionally change or modify the closed caption output format.

In such television broadcast receiver conforming to the EIA-708 standard, the various parameters 131 to 138 are set using e.g. a parameter setting image 150 which is displayed on a monitor as shown in FIG. 13, and which is used by a user to select the parameters 131 to 138. More specifically, for changing the foreground color 133, for example, according to such conventional method of using the parameter setting image 150, the user selects the parameter of foreground color 133 from the parameters, and further selects a desired option (color) from the options (colors) 133a of the foreground color 133. In a similar manner, the user selects a desired option from the options 131a to 138a for each of the parameters 131 to 138. This requires redundant procedures to complete an intended parameter setting.

Furthermore, according to the prior art, the respective parameters 131 to 138 are individually and independently selected. This may cause the following problem, depending on combinations of the options 131a to 138a. More specifically, when one option of a first parameter is selected to change the first parameter, and then one option of a second parameter is selected to change the second parameter, there is a possibility that the option of the first parameter may become invalid due to the selection of the option of the second parameter.

For example, as shown in the parameter table 130 of FIG. 12, according to the options of parameters conforming to the EIA-708 standard, both the foreground (text) opacity 137 and the background opacity 138 include "Transparent" (hereafter referred to as "Foreground (Text) Transparent" and "Background Transparent", respectively, in case of need). If certain options are first selected from the foreground (text) color 133, edge type 136 and edge color 135, and thereafter the option "Transparent" is selected from the options of the foreground opacity 137, then the first selected certain options of these three parameters become invalid. Similarly, if a certain color is first selected from the background color 134, and thereafter the option "transparent" is selected from the options of the background opacity 138, then the first selected certain option of the background color 134 becomes invalid. Thus, there is a possibility that a user may go through redundant or unnecessary procedures to complete an intended parameter setting.

SUMMARY OF THE INVENTION

An object of the present invention is to provide a television broadcast receiver that makes it possible for a user to quickly complete a desired setting of various parameters for a caption output format without going through redundant or unnecessary procedures.

According to the present invention, we provide a television broadcast receiver with caption display capability, comprising; a caption decoder for decoding caption data contained in a television broadcast signal; an on-screen display circuit for superimposing the caption data extracted by the caption decoder as caption on a video image of a television program, and for outputting the video image with the superimposed caption to a monitor, and further for outputting, to the monitor, parameter setting images to be used for changing setting of a caption output format with multiple parameters; an operation unit to be operated by a user for changing the setting of the caption output format; and a setting change unit for allowing the user to select an option, using the operation unit, from multiple options included in each parameter in the caption output format so as to change the caption output format from an output format designated by a broadcast station to an output format which the user desires.

Each parameter setting image includes an image of option combinations, each of which is a combination of two options of two of the parameters, respectively, in which the option combinations are formed as cells in a matrix between the options of one of the two parameters and the options of the other parameter. For changing the setting of the caption output format, the setting change unit controls the on-screen display circuit to output each parameter setting image to the monitor, so as to accept input of an option combination selected by the user, and change the setting of the caption output format on the basis of the option combination selected by the user.

The television broadcast receiver according to the present invention allows a user to select options of a combination of two parameters, respectively, for changing the setting of a caption output format. Accordingly, as compared with the conventional setting in which the user selects options of parameters separately for the respective parameters, the user can more quickly complete an intended parameter setting without going through redundant procedures.

Further, the television broadcast receiver according to the present invention outputs, to the monitor, parameter setting images each having multiple options of two parameters arranged in a matrix, and allows the user to select options of the parameters on the basis of the parameter setting images. Accordingly, the user can easily select desired option combinations by comparing multiple option combinations.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein:

FIG. 2 is a parameter table used in the TV broadcast receiver and listing parameters for a closed caption;

FIG. 12 is a parameter table listing parameters for a closed caption according to a prior art; and FIG. 13 is a parameter setting image displayed on a monitor according to the prior art.

DESCRIPTION OF THE PREFERRED EMBODIMENTS

The best modes and preferred embodiments of the present invention will be described hereinafter with reference to the annexed drawings. Note that the specific embodiments described are not intended to cover the entire scope of the present invention, and hence the present invention is not limited to only the specific embodiments.

Figure 1:
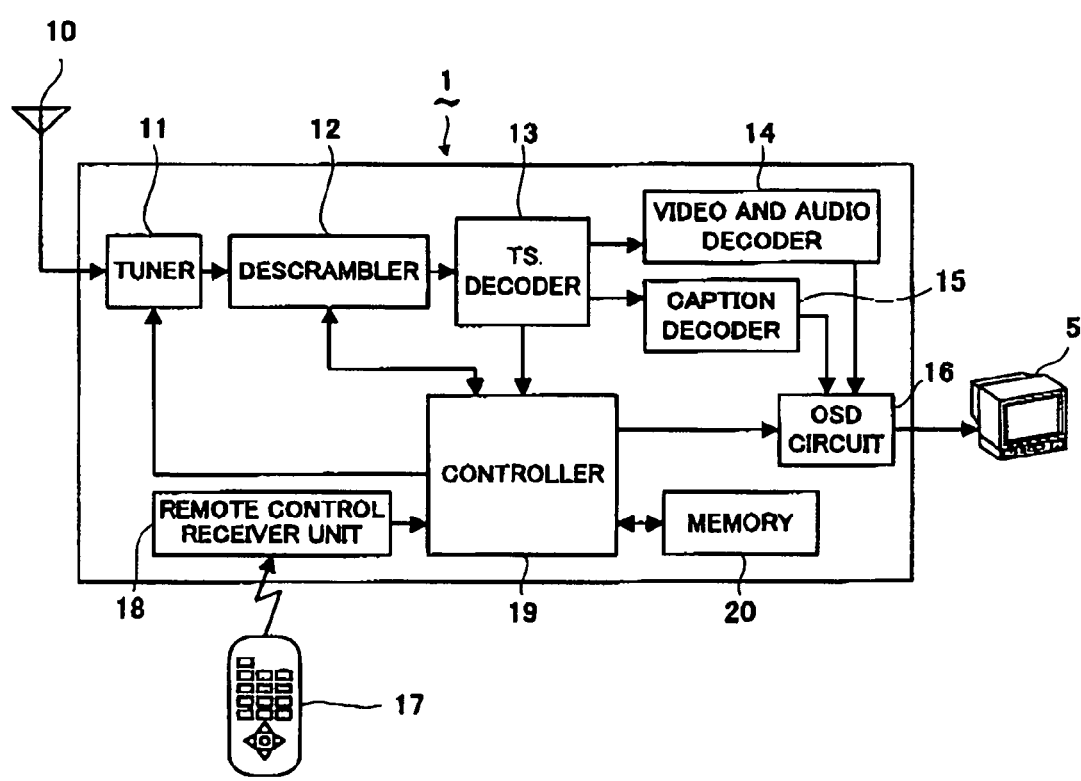
FIG. 1 is a schematic block diagram showing a TV (television) broadcast receiver according to an embodiment of the present invention.

FIG. 1 is a schematic block diagram showing a TV (television) broadcast receiver 1 according to an embodiment of the present invention. Referring to FIG. 1, the TV broadcast receiver 1 receives a digital television broadcast signal (hereafter referred to simply as TV broadcast signal) via an antenna 10, and outputs video signals and audio signals contained in the received TV broadcast signal to a monitor 5. The TV broadcast receiver 1 further extracts closed caption data (caption data) conforming to the EIA-708 standard, and superimposes the closed caption (caption) on an image of a TV program, and further outputs the image with the superimposed closed caption to the monitor 5 in a predetermined output format.

The TV broadcast receiver 1 comprises a tuner 11, a descrambler 12, a TS (Transport Stream) decoder 13, a video and audio decoder 14, a caption decoder 15, an on-screen display (OSD) circuit 16, a remote control receiver unit 18 operated by a remote control 17, a controller (microprocessor) 19 and a memory 20. The tuner 11 selects a TV broadcast signal in a designated frequency band, and subjects the TV broadcast signal to demodulation and error correction so as to output TS packets that are multiplexed and scrambled. The descrambler 12 descrambles the scrambled TS packets to produce multiplexed TS packets. The TS decoder 13 separates necessary TS packets from the multiplexed TS packets, and supplies necessary TS packets to respective units of the TV broadcast receiver 1, including supplying video and audio streams to the video and audio decoder 14 as well as supplying TS packets containing closed caption data to the caption decoder 15.

The video and audio decoder 14 decodes the video and audio streams separated by the TS decoder 13 to produce video and audio signals, and outputs the thus produced video and audio signals to a monitor 5 connected to the TV broadcast receiver 1 via the OSD circuit 16. The caption decoder 15 decodes the TS packets being separated by the TS decoder 13 and containing the closed caption data so as to extract closed caption data contained in the TV broadcast signal. The OSD circuit 16 superimposes the closed caption data extracted by the caption decoder 15 as closed caption on a video image of a TV program, and outputs the video image with the superimposed closed caption to the monitor 5. The OSD circuit 16 furthermore superimposes, on a video image of a TV program, each parameter setting image to be used by a user for changing the setting of a closed caption output format with multiple parameters, and outputs each parameter setting image to the monitor 5.

As will be described later, each parameter setting image includes an image of option combinations, each of which is a combination of two options of two of the above parameters, respectively, in which the option combinations are formed as cells in a matrix, displayed on the parameter setting image, between the options of one of the two parameters and the options of the other parameter. More specifically, the image of the option combinations displayed on each parameter setting image is such that the options of one parameter are arranged in rows (columns), while options of the other parameter are arranged in columns (rows), so as to form regularly arranged selection cells for user selection. Thus, the selection cells represent the option combinations, respectively, in which each one of the option combinations represented by the cells is different from the others.

As will be further described later, according to the present embodiment, each parameter setting image excludes, in advance, an option combination of two options, one or each of which causes significant reduction or loss of discriminability, in whole or in part, of the other, so as to make it impossible to select such option combination or select such two options at the same time. Option combinations can be selected using either one parameter setting image or two (multiple) parameter setting images. An example of option combination to be excluded, as a combination of two options unable to be selected at the same time using one parameter setting image, is a combination of an option of foreground (text or characters) color and an option of background color on a later described color setting image that coincide with each other.

An example of option combination to be excluded, as a combination of two options unable to be selected at the same time using two parameter setting images, is a combination of an option of foreground color on a later described color setting image and an option of edge color on a later described edge setting image that coincide with each other. Thus, the TV broadcast receiver 1 of the present embodiment is required to be able to exclude option combinations each of two options unable to be selected at the same time using two (multiple) parameter setting images. In order to do so, according to the TV broadcast receiver 1, each parameter setting image to be displayed on or output to the monitor 5 is determined on the basis of options already selected in the earlier setting or setting so as to exclude, from the each parameter setting image, options unable to be combined with the already selected options.

The remote control (operation unit) 17 has numeric keys, cursor keys, a decision key and the like that are to be operated by the user, and sends key operation signals corresponding to the respective keys to the remote control receiver unit 18. The remote control 17 is operated by the user for changing the setting of the closed caption output format. Note here that the remote control 17 can be replaced by another operation unit such as operation keys provided on a main body of the TV broadcast receiver 1. The remote control receiver unit 18 receives the key operation signals from the remote control 17, and sends them to the controller 19.

The controller 19 controls the entire TV broadcast receiver 1. Further, the controller 19 serves as a setting change unit for allowing the user to select an option, using the remote control 17, from multiple options included in each parameter in the closed caption output format so as to change closed caption output format from an output format designated by the broadcast station to an output format which the user desires. Furthermore, for changing the setting of the closed caption output format, the controller 19 (setting change unit) controls the OSD circuit 16 to output, to the monitor 5, parameter setting images used by a user each for selecting options of two parameters for the closed caption output format, so as to accept input of an option combination selected by the user, and change the setting of the closed caption output format on the basis of the option combination selected by the user. The memory 20 stores a closed caption display program which is loaded into the controller 19 and executed for displaying closed caption on the monitor 5, and further stores the setting of the closed caption output format for the closed caption display.

Referring now to FIG. 2, which shows a parameter table 30 used in the TV broadcast receiver 1 of the present embodiment and listing parameters for a closed caption, the parameters include font type 31, font size 32, foreground (text) color 33, background color 34, edge color 35, edge type 36, foreground (text) opacity 37 and background opacity 38. Each of the parameters 31 to 38 includes multiple options 31a to 38a, respectively, as follows. The parameter of the font type 31 has eight options (Font 0 to Font 7) 31a, while the parameter of the font size 32 has three options (Large, Middle and Small) 32a.

Each of the two parameters, foreground color 33 and background color 34, has nine options (Black, White, Red, Green, Blue, Yellow, Magenta, Cyan and Transparent) 33a and 34a. The parameter of the edge color 35 has eight options (Black, White, Red, Green, Blue, Yellow, Magenta and Cyan) 35a, while the parameter of the edge type 36 has six options (None, Raised, Depressed, Uniform, Left Drop Shadow and Right Drop Shadow) 36a, indicating absence and five other different features of the edge of the caption, respectively. Furthermore, each of the two parameters, foreground opacity 37 and background opacity 38, has three options (Solid, Flashing and Translucent) 37a and 38a, indicating three different opacities in which "Flashing" indicates that the foreground/background flashes.

According to the present embodiment, the option "Transparent (Foreground Transparent)" which, as shown in FIG. 12, is conventionally contained in the parameter of the foreground opacity 137 is contained in the foreground color 33, not the foreground opacity 37. Likewise, the option "Transparent (Background Transparent)" which, as shown in FIG. 12, is conventionally contained in the parameter of the background opacity 138 is contained in the background color 34, not the background opacity 38.

Figure 3:
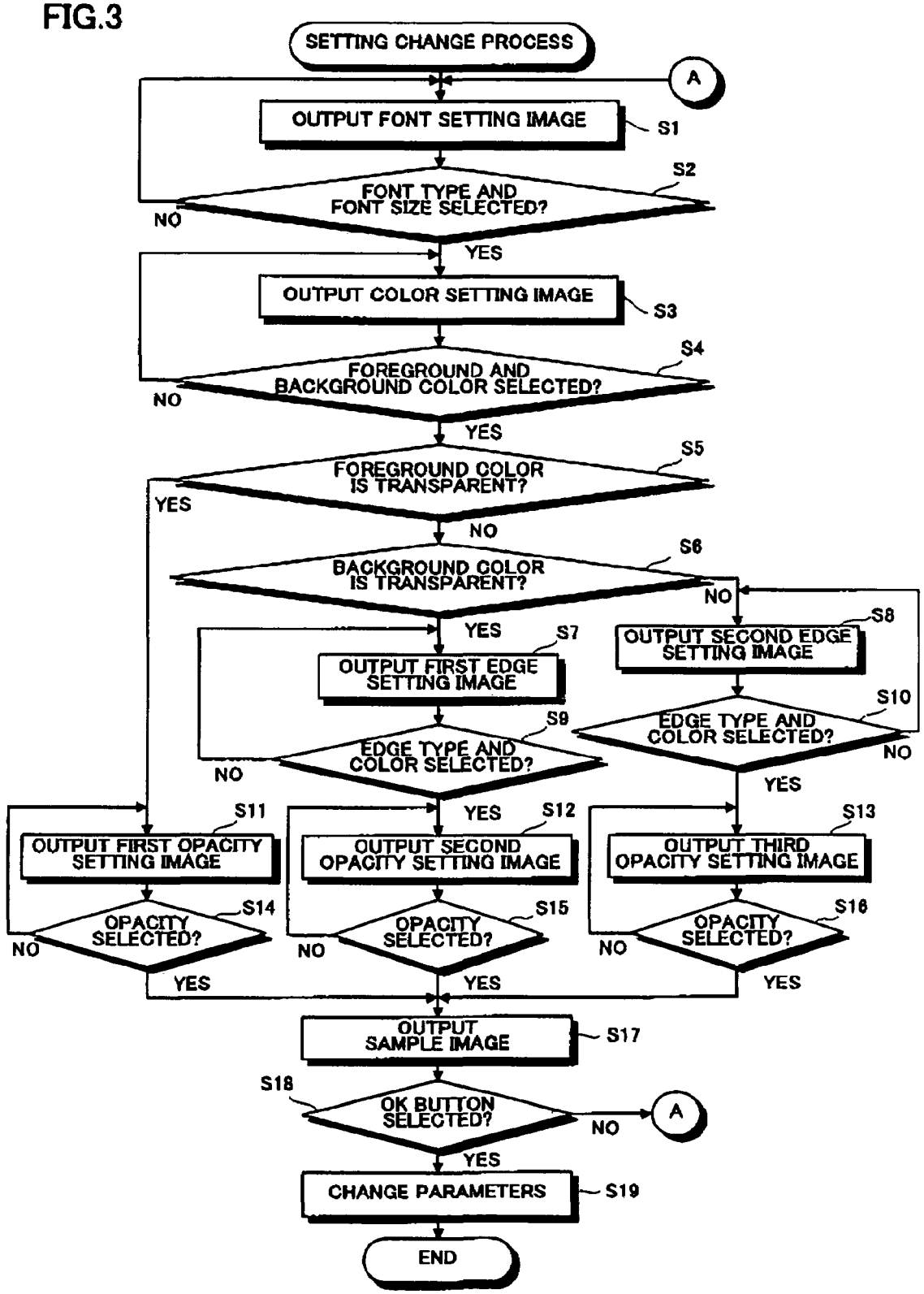
FIG. 3 is a flow chart showing a setting change process of changing a closed caption output format.
Figure 4:
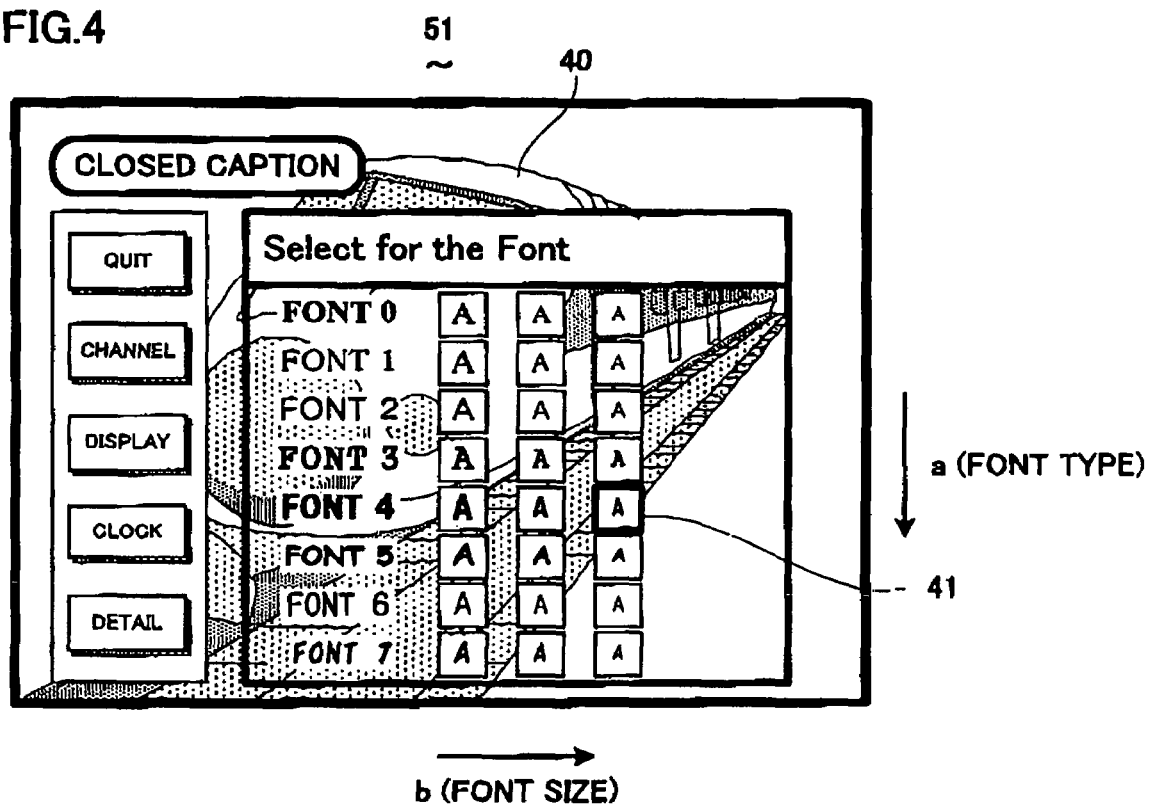
FIG. 4 is an example of a font setting image displayed on a monitor for the setting change process.

Hereinafter, a setting change process of changing a caption output format according to the present embodiment (hereafter such process being sometimes referred to simply as "setting change process") will be described with reference to a flow chart of FIG. 3, examples of various parameter setting images of FIG. 4 to FIG. 10 and an example of sample image of FIG. 11 that are displayed on a monitor 5. When the setting change process starts, the controller 19 (setting change unit) controls the OSD circuit 16 to output, to the monitor 5, a font setting image 51 used by a user for selecting options of the font type 31 and font size 32 as shown in FIG. 4 (S1), and to accept input of an option combination selected by the user.

The font setting image 51 includes option combinations each of a combination of the two parameters, font type 31 and font size 32, in which the options of the two parameters are arranged and displayed in a matrix on the font setting image 51. In other words, the option combinations are formed as cells in the matrix, displayed on the font setting image 51, between the options 31a of the font type 31 and the options 32a of the font size 32. More specifically, on the font setting image 51 as shown in FIG. 4, the options 31a of the font type 31 are arranged in a vertical direction "a", while the options 32a of the font size 32 are arranged in a horizontal direction "b". The image of the option combinations displayed on the font setting image is such that the options 31a of the font type 31 are arranged in rows, while the options 32a of the font size are arranged in columns, so as to form regularly arranged selection cells for user selection. Thus, the selection cells represent the option combinations, respectively, in which each one of the option combinations represented by the selection cells is different from the others. This arrangement of options of two parameters in a matrix, i.e. rows and columns, is common with the other parameter setting images 52 to 57 as will be described later. Using a cursor key or keys of the remote control 17, the user operates a cursor 41 displayed on the parameter setting image on a monitor screen to select a desired combination of options 31a of the font type 31 and options 32a of the font size 32. Note that although the present embodiment shows a case in which "A" is used as an example of a font, it is apparent that the font can be another character or combinations of multiple characters. Further note that the selected combination of the options 31a and 32a based on the font setting image 51 as well as other options 33a to 38a based on other parameter setting images described later is superimposed and rendered on a video image 40 of a TV program, using a closed caption display program.

According to the present embodiment, each parameter setting image displayed on or output to the monitor 5 for changing the setting of caption output format is created by using, or on the basis of, options of parameters selected in an earlier setting or settings. For example, a parameter setting image displayed in a second setting following a first setting is created by using options of parameters selected in the first setting. More specifically, if the font type 31 and font size 32 selected in a first setting by using a font setting image 51 are e.g. "Font 0" and "Large", respectively, then a parameter setting image displayed in a second setting following the first setting has a combination of options of the respective parameters in which the font type 31 and font size 32 are maintained as "Font 0" and "Large", respectively.

Figure 5:
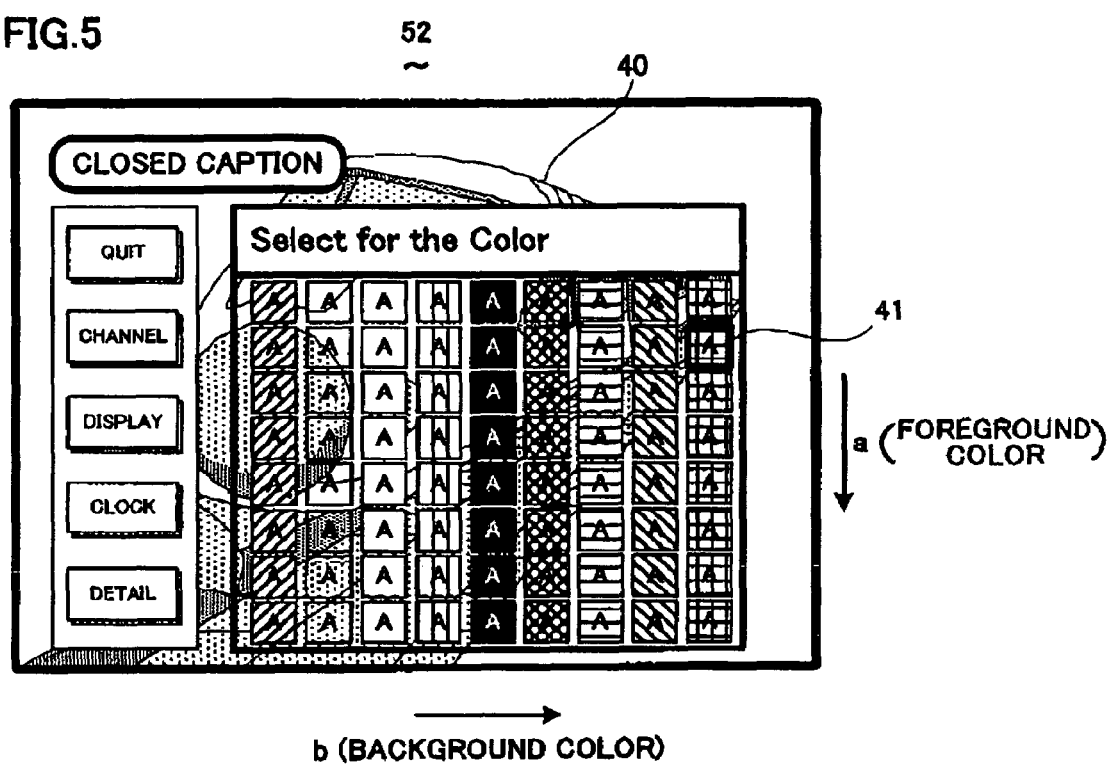
FIG. 5 is an example of a color setting image displayed on the monitor for the setting change process.

When the user selects an option from each of the font type 31 and font size 32 (YES in S2), the controller 19 controls the OSD circuit 16 to output, to the monitor 5, a color setting image 52 used by the user for selecting options of the foreground (text) color 33 and background color 34 as shown in FIG. 5 (S3), and to accept input of an option combination selected by the user. The color setting image 52 includes option combinations each of a combination of the two parameters, foreground color 33 and background color 34, in which the options of the two parameters are arranged and displayed in a matrix on the color setting image 52. In other words, the option combinations are formed as cells in the matrix, displayed on the color setting image 52, between the options 33a of the foreground color 33 and the options 34a of the background color 34, More specifically, on the color setting image 52 as shown in FIG. 5, the options 33a of the foreground color 33 are arranged in the vertical direction "a", while the options 34a of the background color 34 are arranged in the horizontal direction "b".

According to the present embodiment, the color setting image 52 excludes, or does not include, such combination of option 33a and option 34a that coincide with each other, so as to make it impossible to select such combination. This is because if the option 33a of the foreground color (text color) 33 coincides with the option 34a of the background color 34, the foreground (text) cannot be discriminated, so that the closed caption display becomes meaningless. Basically, not only the color setting image 52, but each parameter setting image excludes, in advance, an option combination of two options one or each of which causes significant reduction or loss of discriminability, in whole or in part, of the other, so as to make it impossible to select such option combination or select such two options at the same time. In the present specification, such option combination, one or each causing significant reduction or loss of discriminability of the other, is sometimes referred to simply as "option combination causing significant reduction of discriminability".

When the user selects an option from each of the foreground color 33 and background color 34 (YES in S4), the controller 19 determines whether or not "Foreground Transparent" has been selected by the user as the foreground color 33 (S5). If "Foreground Transparent" has been selected by the user as the foreground color 33 (YES in S5), the controller 19 omits or skips the steps S6 to S10 that constitute a process of allowing the user to select options of the edge type 36 and edge color 35. On the other hand, if "Foreground-Transparent" has not been selected by the user as the foreground color (NO in S5), the controller 19 determines whether or not "Background Transparent" has been selected by the user as the background color 34 (S6).

Figure 6:
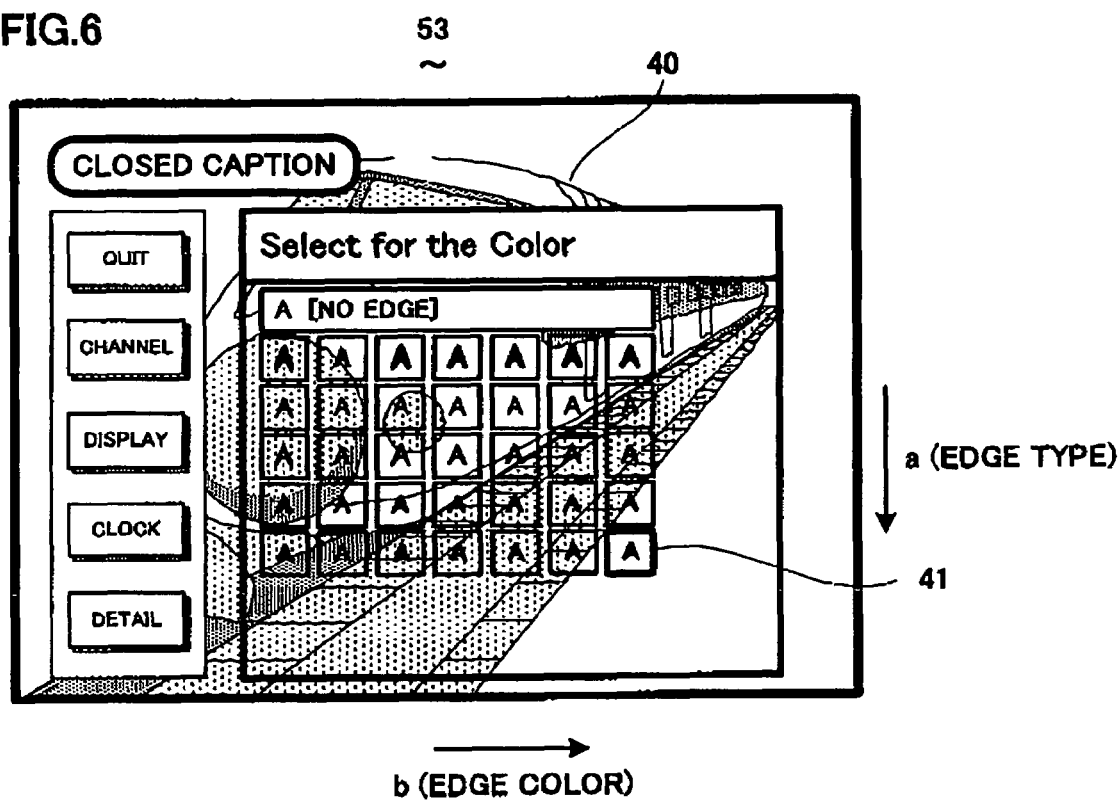
FIG. 6 is an example of a first edge setting image displayed on the monitor for the setting change process.
Figure 7:
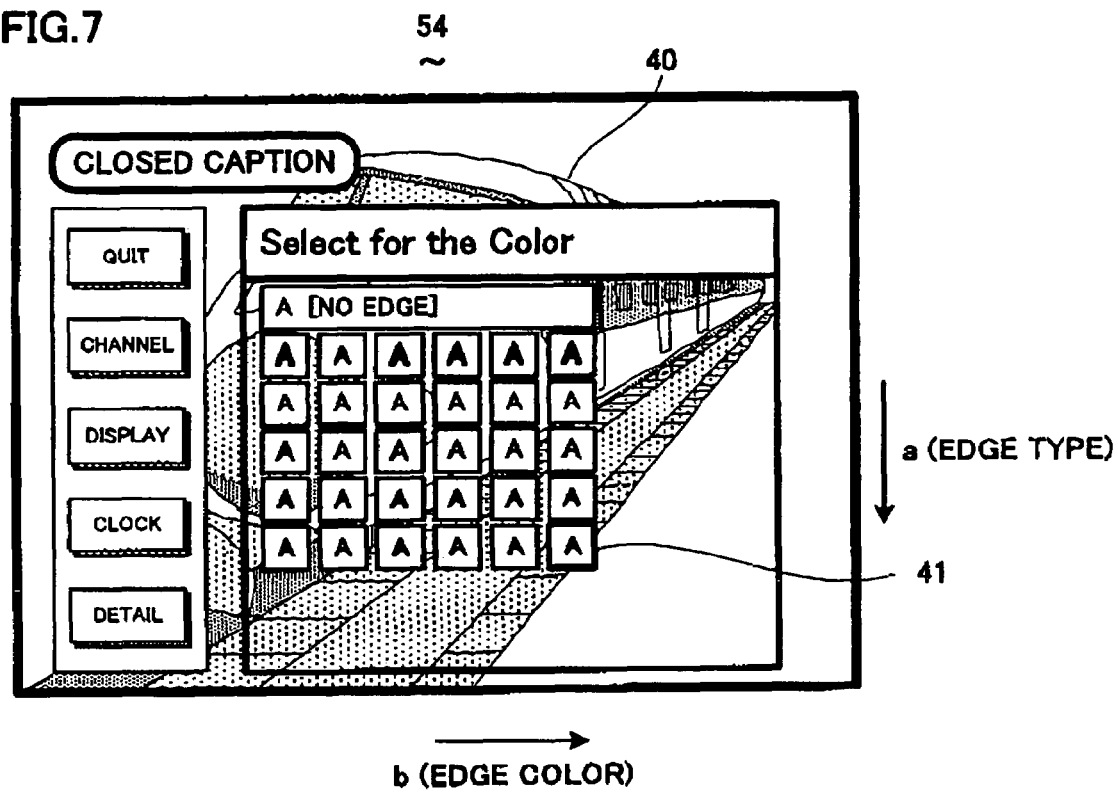
FIG. 7 is an example of a second edge setting image displayed on the monitor for the setting change process.

If "Background Transparent" has been selected by the user as the background color 34 (YES in S6), the controller 19 outputs, to the monitor 5, a first edge setting image 53 as shown in FIG. 6 (S7), while if "Background Transparent" has not been selected by the user as the background color 34 (NO in S6), the controller 19 outputs, to the monitor 5, a second edge setting image 54 as shown in FIG. 7 (S8), so as to allow the user to select options of the edge type 36 and edge color 35. Corresponding to the sequential order of the selections made by the user, the controller 19 (setting change unit) sequentially accepts input of an option combination between the foreground color 33 and the background color 34, and an option combination between the edge type 36 and the edge color 35 in this order.

Each of the first edge setting image 53 and second edge setting image 54 includes option combinations each of a combination of the two parameters, edge type 36 and edge color 35, in which the options of the two parameters are arranged and displayed in a matrix on each of the first edge setting image 53 and second edge setting image 54. In other words, the option combinations are formed as cells in the matrix, displayed on each of the first and second setting images 53 and 54, between the options of the edge type 36 and the edge color 35. More specifically, on each of the first edge setting image 53 and second edge setting image 54 as shown in FIG. 6 and FIG. 7, the options 36a of the edge type 36 are arranged in the vertical direction "a", while the options 35a of the edge color 35 are arranged in the horizontal direction "b". According to the present embodiment, each of the first edge setting image 53 and second edge setting image 54 excludes, as an option combination, such combination of option 33a and option 35a that coincide with each other, and also such combination of option 34a and option 35a that coincide with each other, so as to make it impossible to select such combination. This is because if the option 33a or 34a coincides with the option 35a of the edge color 35, the edge cannot be discriminated, so that the edge display becomes meaningless.

Consequently, if neither the foreground color 33 nor the background color 34 is transparent, then the second edge setting image 54 includes six colors as options, excluding, from the eight options or colors, two colors selected for the foreground color 33 and background color 34. On the other hand, if the foreground color 33 is not transparent (foreground transparent or text transparent), while the background color 34 is transparent (background transparent), then the first edge setting image 53 includes seven colors as options, excluding, from the eight options or colors, one color selected for the foreground color 33.

Figure 8:
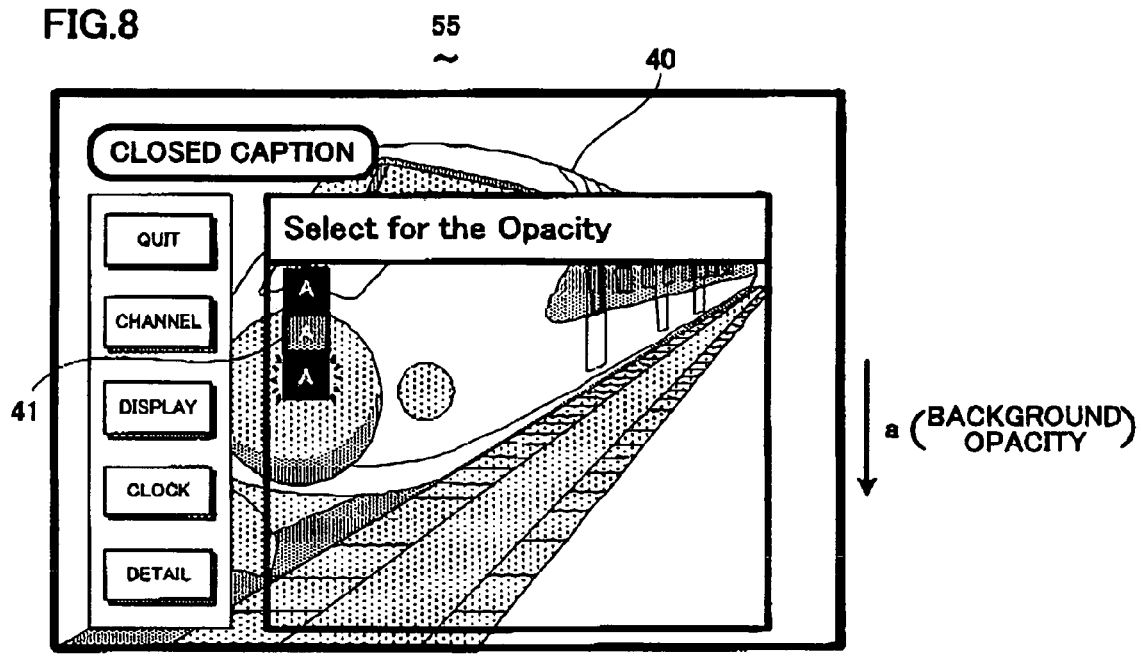
FIG. 8 is an example of a first opacity setting image displayed on the monitor for the setting change process.
Figure 9:
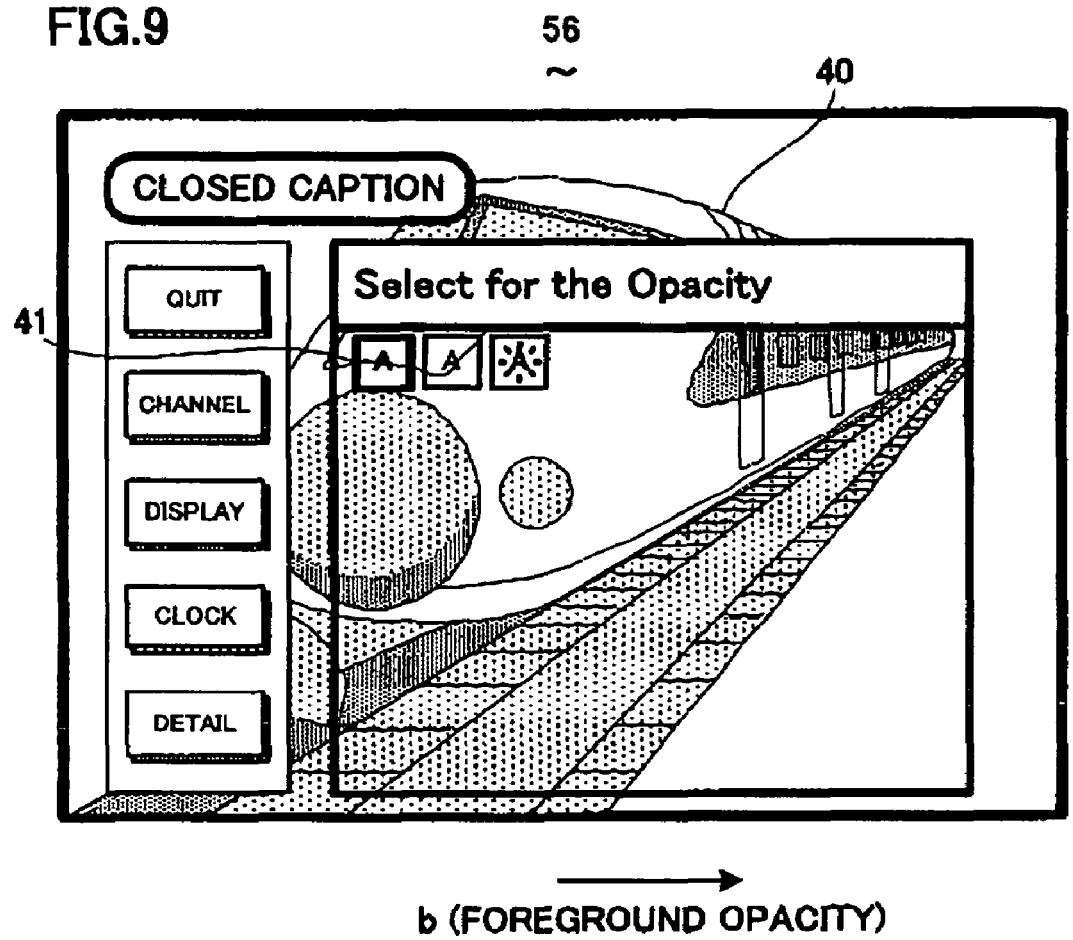
FIG. 9 is an example of a second opacity setting image displayed on the monitor for the setting change process.
Figure 10:
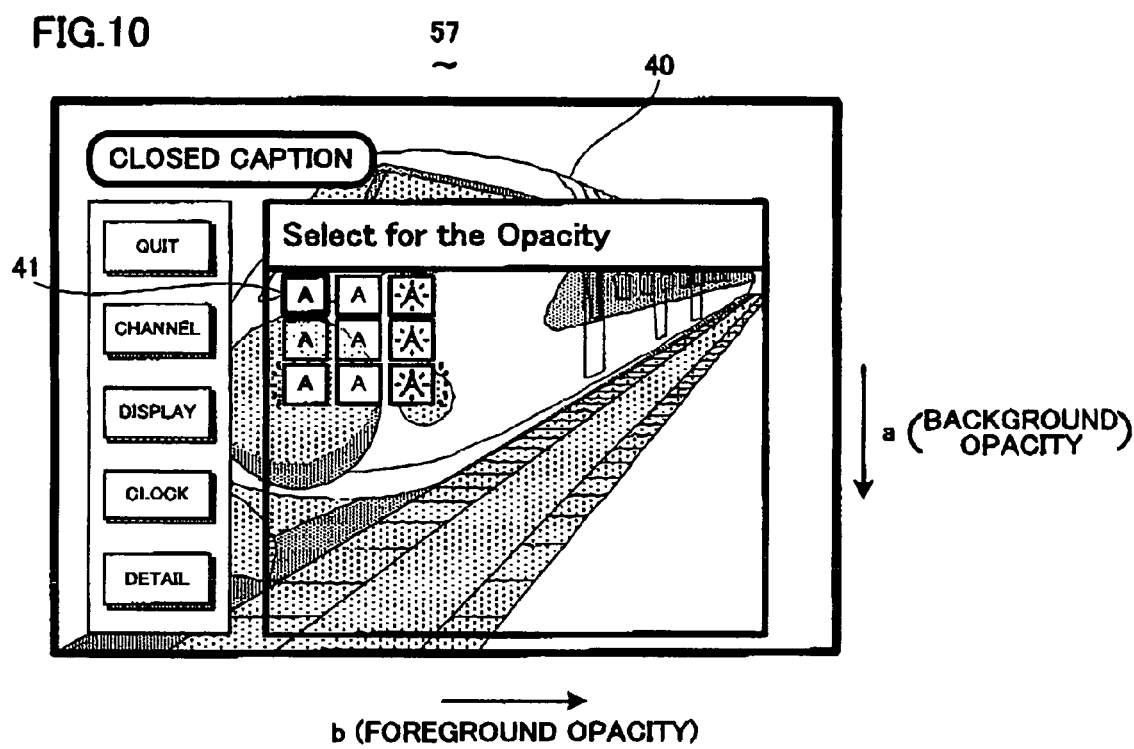
FIG. 10 is an example of a third opacity setting image displayed on the monitor for the setting change process.

On the other hand, if the user selects foreground transparent as the foreground color 33 (YES in 5) or if the user selects certain options of the edge type 36 and edge color 35 (YES in S9 or YES in S10), then the controller 19 outputs, to the monitor 5, opacity setting images 55, 56 and 57 used by the user for selecting options of the foreground opacity (text opacity) 37 and background opacity 38 as shown in FIG. 8, FIG. 9 and FIG. 10 (S11, S12 and S13). Corresponding to the sequential order of the selections made by the user, the controller 19 (setting change unit) sequentially accepts input of an option combination between the foreground color 33 and the background color 34, and an option combination between the foreground opacity 37 and the background opacity 38 in this order.

More specifically, if the user selects foreground transparent as the foreground color 33 (YES in S5), the controller 19 outputs, to the monitor 5, a first opacity setting image 55 including option combinations formed by combining foreground transparent with the respective options of the background opacity 38. Note here that the color setting image 52 excludes, or does not include as an option combination, such combination of option 33a (foreground color 33) and option 34a (background color 34) that coincide with each other. Accordingly, if transparent (foreground transparent) is selected as an option 33a of the foreground color 33, the background color 34 includes all the options 34a except transparent (background transparent).

Thus, if foreground transparent is selected as an option 33a of the foreground color 33, and if an option other than background transparent is selected as an option 34a of the background color 34, the controller 19 outputs a first opacity setting image 55 to the monitor 5. As shown in FIG. 8, in this case, three options of the background opacity 38, and hence three option combinations of the foreground color 33 (transparent) and background opacity 38, are arranged in the vertical direction "a" on the first opacity setting image 55. Here, the three option combinations are combinations of foreground transparent (text transparent) with solid (background solid opaque), translucent (background translucent) and flashing (background flashing), respectively.

Similarly, if the user selects background transparent as the background color 34 (YES in S6 and YES in S9), the controller 19 outputs, to the monitor 5, a second opacity setting image 56 including option combinations formed by combining background transparent with the respective options of the foreground opacity 37. Note here that the color setting image 52 excludes, or does not include as an option combination, such combination of option 33a (foreground color 33) and option 34a (background color 34) that coincide with each other. Accordingly, if transparent (background transparent) is selected as an option 34a of the background color 34, the foreground color 33 includes all the options 33a except transparent (foreground transparent).

Thus, if background transparent is selected as an option 34a of the background color 34, and if an option other than foreground transparent is selected as an option 33a of the foreground color 33, the controller 19 outputs a second opacity setting image 56 to the monitor 5. As shown in FIG. 9, in this case, three options of the foreground opacity 37, and hence three option combinations of the background color 34 (transparent) and foreground opacity 37, are arranged in the horizontal direction "b" on the second opacity setting image 56. Here, the three option combinations are combinations of background transparent with solid (foreground or text solid opaque), translucent (foreground or text translucent) and flashing (foreground or text flashing), respectively.

If the user selects an option 33a and an option 34a of the foreground color 33 and background color that are other than transparent (NO in S6 and YES in S10), the controller 19 outputs, to the monitor 5, a third opacity setting image 57. The third opacity setting image 57 includes option combinations each of a combination of the two parameters, foreground opacity 37 and background opacity 38, in which the options of the two parameters are arranged and displayed in a matrix on the third opacity setting image 57. In other words, the option combinations are formed as cells in the matrix, displayed on the third opacity setting image 57, between the options of the foreground opacity 37 and the background opacity 38. More specifically, on the third opacity setting image 57 as shown in FIG. 10, the options 38a of the background opacity 38 are arranged in the vertical direction "a", while the options 37a of the foreground opacity 37 are arranged in the horizontal direction "b".

Figure 11:
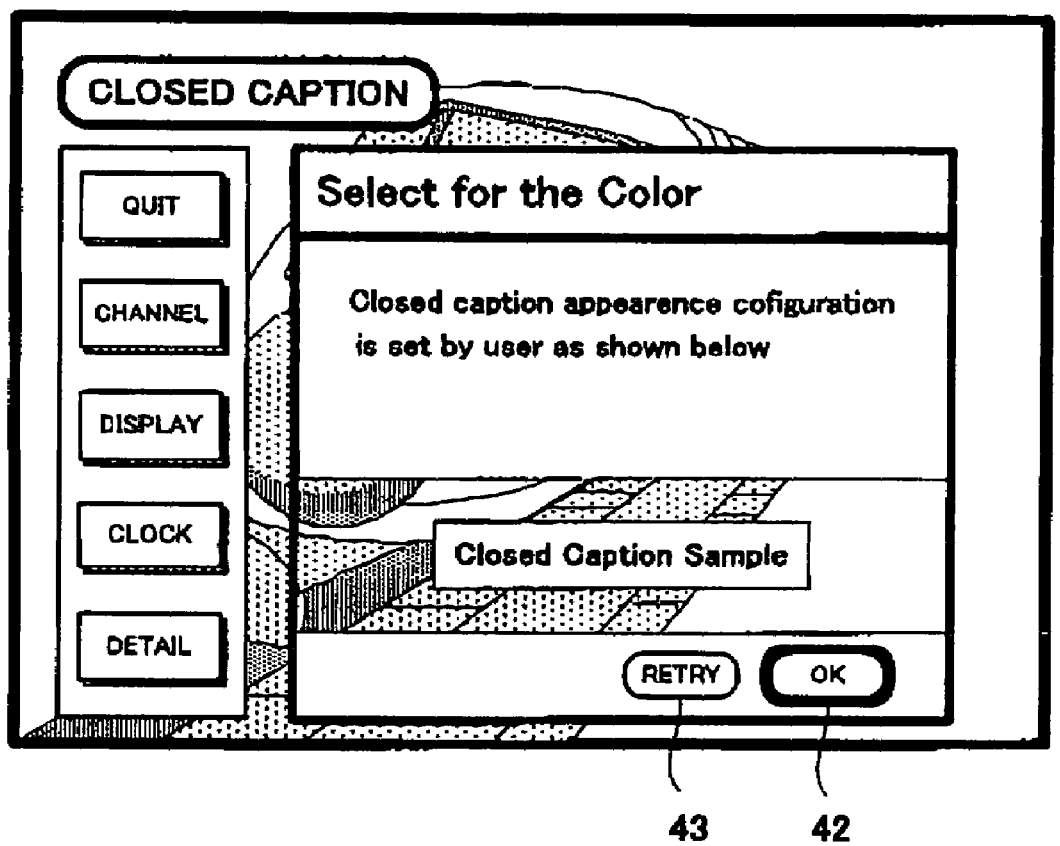
FIG. 11 is an example of a sample image displayed on the monitor for the setting change process.

If the user selects options of the two parameters, i.e. an option 37a of the foreground opacity 37 and an option 38a of the background opacity 38 (YES in S14 or YES in S15 or YES in S16), the controller 19 displays a sample image 58 shown in FIG. 11 on the basis of the respective selected options (S17). Referencing the sample image 58, the user checks whether a closed caption output format having been selected and displayed on the sample image 58 is as good as the user wants it to be. If the closed caption output format having been selected is good, the user selects an OK button 42 (YES in S18). On the other hand, if the user does not like the closed caption output format having been selected, the user selects a RETRY button 43 (NO in S18), whereby the user selects options of respective parameters again, going back to the step S1. If the user selects the OK button 42 (YES in S18), the controller 19 changes the options of the parameters for closed caption display on the basis of the respective options of the parameters having been selected, and stores, in the memory 20, data of the parameters including the changed options (S19).

As described above, for changing the setting of the caption output format, the TV broadcast receiver 1 sequentially outputs, to the monitor 5: a font setting image 51 having an image of options of two parameters, font type 31 and font size 32, arranged in a matrix; a color setting image 52 having an image of options of two parameters, foreground color 33 and background color 34, arranged in a matrix; edge setting image 53 or 54 each having an image of options of two parameters, edge type 36 and edge color 35, arranged in a matrix; and opacity setting image 55, 56 or 57 each having an image of options of two parameters, foreground opacity and background opacity in a matrix (S1, S3, S7, S8, S11, S12 and S13). The TV broadcast receiver 1 allows a user to select the options of each two parameters based on each of the parameter setting images (S2, S4, S9, S10, S14, S15 and S16), and changes the parameter setting image to be output to the monitor 5, depending on whether "Transparent" is selected as the foreground and/or background color (S5 and S6).

In order for the OSD circuit 16 to output a closed caption to the monitor 5, the controller 19 superimposes a closed caption in a predetermined output format on a video image 40 of a TV program on the basis of the closed caption output format having been set and stored in the memory 20, so that the video image 40 with the closed caption in the predetermined output format is output to the monitor 5. Note that if the closed caption output format designated by the broadcast station is not changed by the above setting change process, the TV broadcast receiver 1 displays the closed caption in the output format designated by the broadcast station as is.

As described in the foregoing, the TV broadcast receiver 1 according to the present embodiment allows a user to select options of a combination of two parameters, respectively, for changing the setting of a caption output format. Accordingly, as compared with the conventional setting in which the user selects options of parameters separately for the respective parameters without correlating the options of the respective parameters, the user can more quickly complete an intended parameter setting without going through redundant or unnecessary procedures.

Further, the TV broadcast receiver 1 outputs, to a monitor 5, parameter setting images 51 to 57 each having multiple options of two parameters arranged in a matrix, and allows the user to select options of the parameters on the basis of the parameter setting images 51 to 57. Accordingly, the user can easily select desired option combinations by comparing multiple option combinations. In addition, the TV broadcast receiver 1 superimposes each of the parameter setting images 51 to 57 on the video image 40, and outputs the video image 40 with the superimposed parameter setting image to the monitor 5. Accordingly, the user can select options 31a to 38a of the respective parameters 31 to 38, imagining a state where closed caption is superimposed on the video image 40 of the TV program.

Further, according to the TV broadcast receiver 1, "Transparent", which is an option (137a/138a) of the foreground (text) opacity (137) and background opacity (138) according to the prior art, is added as an option of "Foreground (Text) Transparent" and "background Transparent" (33a/34a) of the foreground (text) color 33 and background color 34. Accordingly, options 33a and 34a of the foreground color 33 and background color 34, which are selected in an earlier setting or settings, are prevented from becoming invalid due to options 37a and 38a which are selected later. Thus, the user can quickly complete an intended parameter setting without going through redundant or unnecessary procedures.

Furthermore, if the option 33a of the foreground color 33 selected by the user is "Foreground Transparent", and if the option 34a of the background color 34 selected by the user is other than "Background Transparent", the TV broadcast receiver 1 outputs a first opacity setting image 55 to the monitor 5 so that the user can select an option 38a of the background opacity 38. If the option 34a of the background color 34 selected by the user is "Background Transparent", and if the option 33a of the foreground color 33 selected by the user is other than "Foreground Transparent", the TV broadcast receiver 1 outputs a second opacity setting image 56 to the monitor 5 so that the user can select an option 37a of the foreground opacity 37. On the other hand, if the option 33a of the foreground color 33 selected by the user is other than "Foreground Transparent", and if the option 34a of the background color 34 selected by the user is other than "Background Transparent", the TV broadcast receiver 1 outputs a third opacity setting image 57 to the monitor 5 so that the user can select an option 37a and an option 34a of the foreground opacity 37 and background opacity 38. Accordingly, the TV broadcast receiver 1 can exclude unnecessary option combinations of the options 37a and 38a of the foreground and background opacities 37 and 38, depending on the selected options 33a and 34a of the foreground and background colors 33 and 34. This makes it easier for the user to select desired options 37a and 38a of the foreground and background opacities 37 and 38.

In addition, if the option 33a of the foreground (text) color 33 is other than "Foreground (Text) Transparent", the TV broadcast receiver 1 outputs a first edge setting image 53 or a second edge setting image 54 to the monitor 5 so that the user can select an option 36a of the edge type 36 or an option 35a of the edge color 35. Accordingly, the TV broadcast receiver 1 can omit the procedure of selecting the option 36a of the edge type 36 or the option 35a of the edge color 35, depending on the option 33a of the foreground color 33 selected by the user.

In the manner described above, for changing the setting of the caption output format, the TV broadcast receiver 1 excludes option combinations causing significant reduction of discriminability. More specifically, the TV broadcast receiver 1 excludes, from each parameter setting image, an option combination of two options one or each of which causes significant reduction or loss of discriminability, in whole or in part, of the other, so as to make it impossible to select such option combination or select such two options at the same time. Accordingly, the user can select desired options of the respective parameters from option combinations, excluding unnecessary option combinations, without being required to make unnecessary selections.

It is to be noted that the present invention is not limited to the above embodiments, and various modifications are possible. For example, the caption data is not limited to closed caption data conforming to the ETA-708 standard, but can be other closed caption data such as those conforming to the EIA-608 standard, or other caption data.

The present invention has been described above using presently preferred embodiments, but such description should not be interpreted as limiting the present invention. Various modifications will become obvious, evident or apparent to those ordinarily skilled in the art, who have read the description. Accordingly, the appended claims should be interpreted to cover all modifications and alterations which fall within the spirit and scope of the present invention.

What is claimed is:

1. A television broadcast receiver with caption display capability, comprising:
    a caption decoder for decoding caption data contained in a television broadcast signal;
    an on-screen display circuit for superimposing the caption data extracted by the caption decoder as caption on a video image of a television program, and for outputting the video image with the superimposed caption to a monitor, and further for outputting, to the monitor, parameter setting images to be used for changing setting of a caption output format with multiple parameters;
    an operation unit to be operated by a user for changing the setting of the caption output format; and
    a setting change unit for allowing the user to select an option, using the operation unit, from multiple options included in each parameter in the caption output format so as to change the caption output format from an output format designated by a broadcast station to an output format which the user desires,
    wherein each parameter setting image includes an image of option combinations, each of which is a combination of two options of two of the parameters, respectively, in which the option combinations are formed as cells in a matrix between the options of one of the two parameters and the options of the other parameter, and
    wherein for changing the setting of the caption output format, the setting change unit controls the on-screen display circuit to output each parameter setting image to the monitor, so as to accept input of an option combination selected by the user, and change the setting of the caption output format on the basis of the option combination selected by the user.

2. The television broadcast receiver according to claim 1, wherein each parameter setting image excludes option combinations causing significant reduction of discriminability.

3. The television broadcast receiver according to claim 2, wherein the parameters include foreground color and background color of the caption, and
    wherein the parameter setting images comprise a color setting image including an image of option combinations, each of which is a combination of options of the foreground color and options of the background color, respectively, in which the option combinations are formed as cells in a matrix between the options of the foreground color and the options of the background color.

4. The television broadcast receiver according to claim 1, wherein the parameters include foreground color and background color of the caption, and
    wherein the parameter setting images comprise a color setting image including an image of option combinations, each of which is a combination of options of the foreground color and options of the background color, respectively, in which the option combinations are formed as cells in a matrix between the options of the foreground color and the options of the background color.

5. A television broadcast receiver with caption display capability, comprising:
    a caption decoder for decoding caption data contained in a television broadcast signal:
    an on-screen display circuit for superimposing the caption data extracted by the caption decoder as caption on a video image of a television program, and for outputting the video image with the superimposed caption to a monitor, and further for outputting, to the monitor, parameter setting images to be used for changing setting of a caption output format with multiple parameters;
    an operation unit to be operated by a user for changing the setting of the caption output format; and
    a setting change unit for allowing the user to select an option, using the operation unit, from multiple options included in each parameter in the caption output format so as to change the caption output format from an output format designated by a broadcast station to an output format which the user desires, wherein each parameter setting image includes an image of option combinations, each of which is a combination of two options of two of the parameters, respectively, in which the option combinations are formed as cells in a matrix between the options of one of the two parameters and the options of the other parameter, wherein for changing the setting of the caption output format, the setting chance unit controls the on-screen display circuit to output each parameter setting image to the monitor, so as to accept input of an option combination selected by the user, and change the setting of the caption output format on the basis of the option combination selected by the user, wherein each parameter setting image excludes option combinations causing significant reduction of discriminability, wherein the parameters include foreground color and background color of the caption, wherein the parameter setting images comprise a color setting image including an image of option combinations, each of which is a combination of options of the foreground color and options of the background color, respectively, in which the option combinations are formed as cells in a matrix between the options of the foreground color and the options of the background color, wherein the parameters further include foreground opacity and background opacity of the caption, wherein the options of the foreground color include foreground transparent, while the options of the foreground opacity exclude the foreground transparent, wherein the options of the background color include background transparent, while the options of the background opacity exclude the background transparent, wherein the parameter setting images further comprise:

a first opacity setting image formed by combining the foreground transparent with the options of the background opacity;

a second opacity setting image formed by combining the background transparent with the options of the foreground opacity; and a third opacity setting image including an image of option combinations, each of which is a combination of the options of the foreground opacity and the options of the background opacity, respectively, in which the option combinations are formed as cells in a matrix between the options of the foreground opacity and the options of the background opacity, wherein for changing the setting of the caption output format, the setting change unit sequentially accepts input of an option combination between the foreground color and the background color, and an option combination between the foreground opacity and the background opacity in this order, wherein if the foreground transparent is selected as the option of the foreground color, and if an option other than the background transparent is selected as an option of the background color, the setting change unit controls the on-screen display circuit to output the first opacity setting image to the monitor, and accepts input of an option combination between the foreground transparent and the background opacity, wherein if the background transparent is selected as the option of the background color, and if an option other than the foreground transparent is selected as an option of the foreground color, the setting change unit controls the on-screen display circuit to output the second opacity setting image to the monitor, and accepts input of an option combination between the background transparent and the foreground opacity, and wherein if an option other than the foreground transparent is selected as the option of the foreground color, and if an option other than the background transparent is selected as the option of the background color, the setting change unit controls the on-screen display circuit to output the third opacity setting image to the monitor, and accepts input of an option combination between the foreground opacity and the background opacity.

6. The television broadcast receiver according to claim 5, wherein the parameters further include edge type and edge color of the caption, wherein the parameter setting images further comprise an edge setting image including an image of option combinations, each of which is a combination of the options of the edge type and the options of the edge color, respectively, in which the option combinations are formed as cells in a matrix between the options of the edge type and the options of the edge color, wherein for changing the setting of the caption output format, the setting change unit sequentially accepts input of an option combination between the foreground color and the background color, and an option combination between the edge type and the edge color in this order, and wherein if an option other than the foreground transparent is selected as the option of the foreground color, the setting change unit controls the on-screen display circuit to output the edge setting image to the monitor, and accepts input of an option combination between the edge type and the edge color.

7. The television broadcast receiver according to claim 6, wherein the option combinations causing significant reduction of discriminability include, and the color setting image excludes as an option combination, a combination of an option of the foreground color and an option of the background color that coincide with each other.

8. The television broadcast receiver according to claim 7, wherein the option combinations causing significant reduction of discriminability include, and the edge setting image excludes as an option combination, a combination of an option of the foreground color and an option of the edge color that coincide with each other as well as a combination of an option of the background color and an option of the edge color that coincide with each other.

9. The television broadcast receiver according to claim 8, wherein the parameters further include font type and font size of the caption, and wherein the setting images further comprise a font setting image including an image of option combinations, each of which is a combination of the options of the font type and the options of the font size, respectively, in which the option combinations are formed as cells in a matrix between the options of the font type and the options of the font size.

10. The television broadcast receiver according to claim 9, wherein each parameter setting image to be output to the monitor is determined on the basis of options of parameters already selected in earlier setting or settings.

11. The television broadcast receiver according to claim 10, wherein the on-screen display circuit superimposes each parameter setting image on a video image of a TV program, and outputs the video image with the parameter setting image to the monitor.

12. A television broadcast receiver with caution display capability, comprising:
a caption decoder for decoding caption data contained in a television broadcast signal;
an on-screen display circuit for superimposing the caution data extracted by the caution decoder as caption on a video image of a television program, and for outputting the video image with the superimposed caption to a monitor, and further for outputting, to the monitor, parameter setting images to be used for changing setting of a caption output format with multiple parameters;
an operation unit to be operated by a user for changing the setting of the caption output format; and
a setting change unit for allowing the user to select an option, using the operation unit, from multiple options included in each parameter in the caption output format so as to change the caption output format from an output format designated by a broadcast station to an output format which the user desires,
wherein each parameter setting image includes an image of option combinations, each of which is a combination of two options of two of the parameters, respectively, in which the option combinations are formed as cells in a matrix between the options of one of the two parameters and the options of the other parameter,
wherein for changing the setting of the caution output format, the setting change unit controls the on-screen display circuit to output each parameter setting image to the monitor, so as to accept input of an option combination selected by the user, and change the setting of the caption output format on the basis of the option combination selected by the user,
wherein the parameters include foreground color and background color of the caption, and
wherein the parameter setting images comprise a color setting image including an image of option combinations, each of which is a combination of options of the foreground color and options of the background color, respectively, in which the option combinations are formed as cells in a matrix between the options of the foreground color and the options of the background color,
wherein the parameters further include foreground opacity and background opacity of the caption,
wherein the options of the foreground color include foreground transparent, while the options of the foreground opacity exclude the foreground transparent,
wherein the options of the background color include background transparent, while the options of the background opacity exclude the background transparent,
wherein the parameter setting images further comprise:
a first opacity setting image formed by combining the foreground transparent with the options of the background opacity;
a second opacity setting image formed by combining the background transparent with the options of the foreground opacity; and
a third opacity setting image including an image of option combinations, each of which is a combination of the options of the foreground opacity and the options of the background opacity, respectively, in which the option combinations are formed as cells in a matrix between the options of the foreground opacity and the options of the background opacity,
wherein for changing the setting of the caption output format, the setting change unit sequentially accepts input of an option combination between the foreground color and the background color, and an option combination between the foreground opacity and the background opacity in this order,
wherein if the foreground transparent is selected as the option of the foreground color, and if an option other than the background transparent is selected as an option of the background color, the setting change unit controls the on-screen display circuit to output the first opacity setting image to the monitor, and accepts input of an option combination between the foreground transparent and the background opacity,
wherein if the background transparent is selected as the option of the background color, and if an option other than the foreground transparent is selected as an option of the foreground color, the setting change unit controls the on-screen display circuit to output the second opacity setting image to the monitor, and accepts input of an option combination between the background transparent and the foreground opacity, and
wherein if an option other than the foreground transparent is selected as the option of the foreground color, and if an option other than the background transparent is selected as the option of the background color, the setting change unit controls the on-screen display circuit to output the third opacity setting image to the monitor, and accepts input of an option combination between the foreground opacity and the background opacity.

13. The television broadcast receiver according to claim 12,
wherein the parameters further include edge type and edge color of the caption,
wherein the parameter setting images further comprise an edge setting image including an image of option combinations, each of which is a combination of the options of the edge type and the options of the edge color, respectively, in which the option combinations are formed as cells in a matrix between the options of the edge type and the options of the edge color,
wherein for changing the setting of the caption output format, the setting change unit sequentially accepts input of an option combination between the foreground color and the background color, and an option combination between the edge type and the edge color in this order, and
wherein if an option other than the foreground transparent is selected as the option of the foreground color, the setting change unit controls the on-screen display circuit to output the edge setting image to the monitor, and accepts input of an option combination between the edge type and the edge color.

14. The television broadcast receiver according to claim 13,
wherein the parameters further include font type and font size of the caption, and
wherein the setting images further comprise a font setting image including an image of option combinations, each of which is a combination of the options of the font type and the options of the font size, respectively, in which the option combinations axe formed as cells in a matrix between the options of the font type and the options of the font size.

15. The television broadcast receiver according to claim 14,
  wherein each parameter setting image to be output to the monitor is determined on the basis of options of parameters already selected in earlier setting or settings.

16. The television broadcast receiver according to claim 15,
  wherein the on-screen display circuit superimposes each parameter setting image on a video image of a TV program, and outputs the video image with the parameter setting image to the monitor.

* * * * *